United States Patent [19]

Dreibelbis

[11] Patent Number: 4,808,892
[45] Date of Patent: Feb. 28, 1989

[54] BI-DIRECTIONAL DRIVE MOTOR SYSTEM
[75] Inventor: John D. Dreibelbis, Chalfont, Pa.
[73] Assignee: Kulick and Soffa Ind. Inc., Willow Grove, Pa.
[21] Appl. No.: 134,702
[22] Filed: Dec. 18, 1987

Related U.S. Application Data

[63] Continuation of Ser. No. 808,653, Dec. 13, 1985, abandoned.

[51] Int. Cl.$^4$ ............................................. H02K 41/02
[52] U.S. Cl. ..................................... 318/135; 310/12; 318/38
[58] Field of Search ............... 310/12, 13, 14; 318/35, 318/37, 38, 135

[56]  References Cited
U.S. PATENT DOCUMENTS

| 4,506,204 | 3/1985 | Galburt | 318/653 |
| 4,506,205 | 3/1985 | Trost et al. | 318/653 |
| 4,507,597 | 3/1985 | Trost | 318/38 |
| 4,667,139 | 5/1987 | Hirai et al. | 318/687 |

FOREIGN PATENT DOCUMENTS 0023357 1/1981 Japan ..................................... 310/12

Primary Examiner—Patrick R. Salce
Assistant Examiner—Judson H. Jones
Attorney, Agent, or Firm—John B. Sowell

[57] ABSTRACT

A bi-directional drive motor of the type having a force coil suspended in a magnetic field of a magnetic core assembly is provided. The force coil is made larger than the center pole piece which it surrounds so that the force coil is movable transverse to the length of the center pole piece as well as along its length to provide both X and Y directional movement. When two force coils are connected together on orthogonal axes and mounted in a common magnetic core assembly, X and Y directional movement is provided in a single drive motor system. When two drive motor systems are coupled to the same side of a top stage of a load platform, rotational or theta positioning is provided in addition to X and Y positional movement.

20 Claims, 4 Drawing Sheets

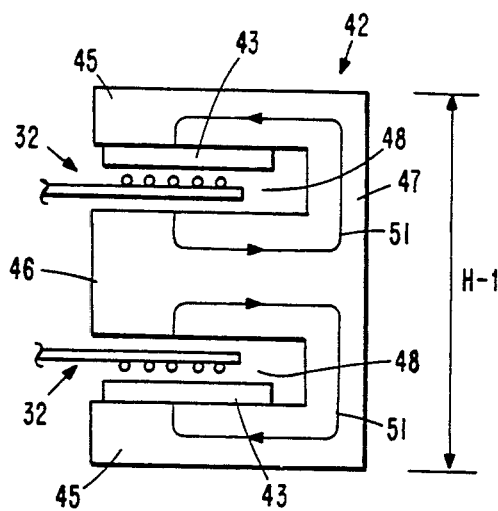
FIG. 5
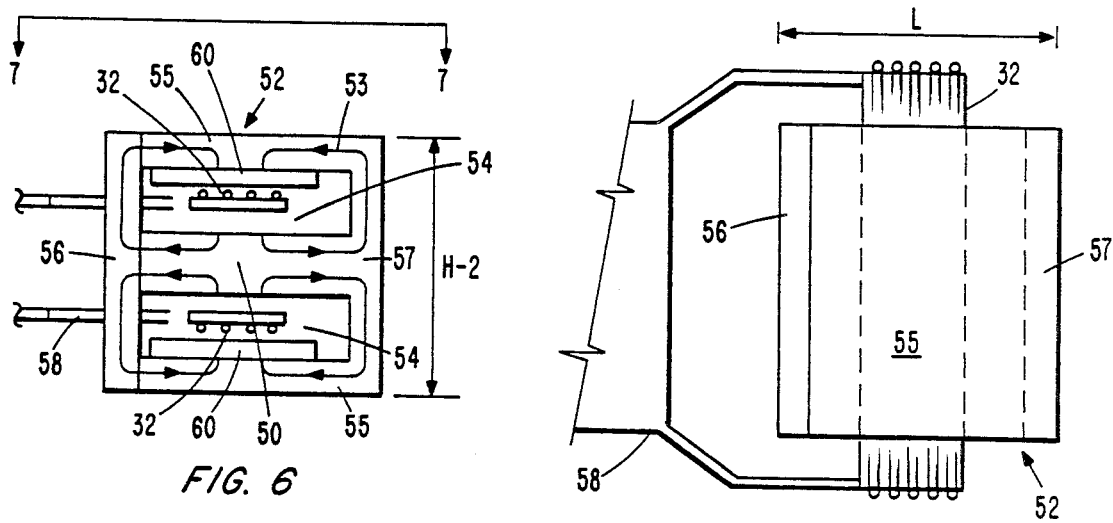
FIG. 6
FIG. 7
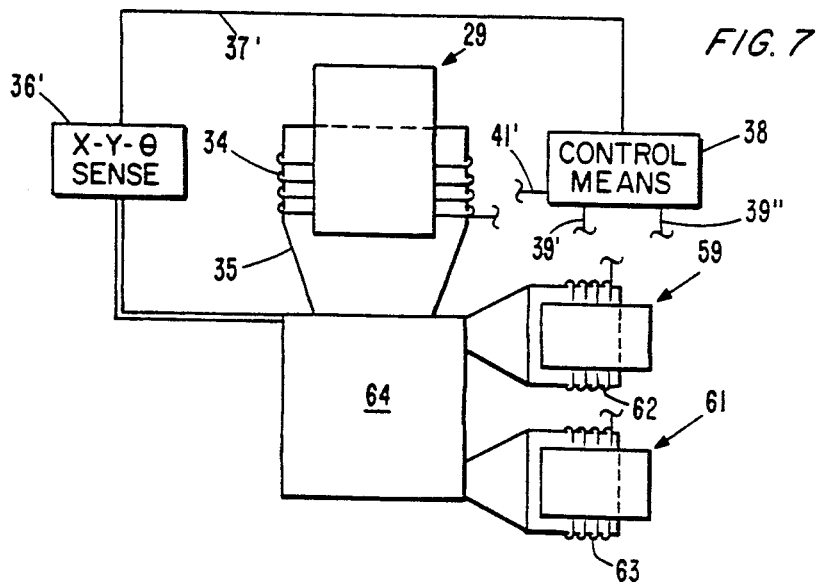
FIG. 8

BI-DIRECTIONAL DRIVE MOTOR SYSTEM

This is a continuation of application Ser. No. 808,653, filed Dec. 13, 1985, now abandoned.

BACKGROUND OF THE INVENTION

1. Field of the Invention

The present invention relates to a bi-directional drive motor having a force coil which is capable of moving in both an X and a Y direction. More particularly, the present invention relates to bi-directional drive systems for positioning objects such as a load platform for high speed machines and robotic devices.

2. Description of the Prior Art

High speed assembly machines such as those used in the semiconductor and electronics industry are presently available to perform various steps in the manufacture of finished products as well as the components and sub-assemblies for such products.

High speed automatic wire bonders and die bonders are presently available which perform the steps of bonding semiconductor chip to substrates and then connecting the terminal pads on a semiconductor chip or device to the lead out pad on conductors which connect the chip to other devices or circuitry. Both die bonders and wire bonders require that the substrate or device be moved relative to the bonding tool at each bonding point. In the case of wire bonders, the fine wire in a capillary or wedge bonding tool is bonded to a pad on the semiconductor chip and then moved to a second bond position at a lead out pad. It will be understood that this relative movement can be accomplished by moving a load platform on which the bonding head is supported or alternatively by moving the X-Y positioning table which supports the semiconductor device (or substrate) on a work station. U.S. Pat. Nos. 4,266,710 and 4,361,261 issued to Kulicke and Soffa Industries of Horsham, Pa. show automatic wire bonders which employ X-Y positioning tables. Each wire bond interconnection is completed in approximately 200 milliseconds which requires that the X-Y positioning table move to a new position in a fraction of the bonding cycle time. It is not sufficient that X-Y positioning table drive motors be fast, but they must also be extremely accurate. As semi-conductor devices become more dense, a larger number of terminal pads are required, the size of such pads has been reduced to an optimum in smallness commensurate with supporting a proper wire bond. If the accuracy of the drive motor and its encoder are limited, the pad size must be increased to assure that proper wire bonds are made. While the positioning of a carrier or substrate prior to die bonding is not as crutial time wise, the accuracy of positioning the chip is an important factor which does affect yields of proper wire bonds.

Heretofore, X-Y position tables such as those sold by Kulicke and Soffa Industries have employed a.c. and d.c. drive motors as well as large cylindrical coils operated as voice coil motors and linear motors to position X-Y tables. All of these prior art motors have been adapted to drive a load in one direction only as will be explained in greater detail hereinafter.

U.S. Pat. No. 3,771,034 shows and describes a coil which has two vertical partial portions and a lower horizontal portion suspended in a magnetic field provided by a permanent magnetic and a hollow core assembly. Depending on the direction of current in the lower horizontal coil a vertical force is applied to a bracket attached to a type carrier which is positioned vertically opposite a solenoid striker which also moves. No means are provided for moving to a desired position and stopping. The coil can only be moved up or down to a desired position by the structure described.

None of the prior art motors are adapted to efficiently move a large mass in both an X and Y direction, i.e. bi-directional, but are constrained to drive a load in a single direction. U.S. Pat. No. 3,437,482 and art cited therein disclose a magnetic positioning device for moving a marker in a direction which is not constrained to a single X or Y direction, however, such systems are not adaptable to position a load platform for high speed bonding machines.

Applicant has concluded that it would be extremely desirable to provide a bi-directional drive motor system for an X-Y positioning table or platform which is faster, more economical to build and capable of more accurate positioning of a load platform than systems known heretofore in the prior art.

SUMMARY OF THE INVENTION

It is the principal object of the present invention to provide a novel drive motor for accurately positioning a load platform.

It is another principal object of the present invention to provide a novel X-Y bi-directional drive motor.

It is a general object of the present invention to provide a bi-direction drive motor system for positioning a load platform in a predetermined X and Y position.

It is yet another general object of the present invention to provide a bi-direction drive motor system having means for generating rotational positioning (theta) as well as X and Y positioning.

It is another general object of the present invention to provide a novel bi-directional drive motor having a core assembly of end pole pieces and a center pole piece cooperating with a force coil assembly.

It is yet another general object of the present invention to provide an economical, efficient and extremely accurate bi-directional drive motor.

According to these and other objects of the present invention, there is provided a bi-directional drive motor having a pair of force coils mounted on coil assemblies. The force coil assemblies are mounted over center pole pieces in an air gap between the center pole piece and outer pole pieces on coil supports connected to a movable load platform stage. The coil assemblies are made larger than the center pole pieces to enable the coil assemblies to move in a force direction when energized and to be moved in a direction transverse to the force direction and thus provide bi-directional movement in an X and Y direction.

BRIEF DESCRIPTION OF THE DRAWINGS

FIG. 5 is an enlarge elevation in partial section of the "E" shaped magnetic core assembly shown in FIGS. 3 and 4;

FIG. 6 is an enlarged elevation in partial section of an "E-I" shaped magnetic core assembly;

FIG. 7 is a top or plan view of the core assembly of FIG. 6;

FIG. 8 is a top or plan view of a modified bi-directional drive motor system which is capable of rotating the top stage of the load platform while providing X and Y positioning;

DESCRIPTION OF THE PREFERRED EMBODIMENT

The present invention is concerned with a novel bi-directional motor which operates on a linear motor principle. Linear motors are adapted to drive in axial alignment with a guide or slider to eliminate any axial thrust. The present novel bi-directional motor is adapted to accommodate motion in a transverse direction while exerting thrust in an axial direction. The mechanism contains a force coil which is situated in a magnetic field designed such that the force coil has freedom of motion in two directions in the same plane but can only develop force in one direction unless modified as will be explained hereinafter.

The main feature of the present invention is its simplicity and accuracy. While the invention will be explained in conjunction with driving an X-Y positioning table, it will be understood that the bi-directional motors have numerous other applications. For example, in the semiconductor art, it is desirable to accurately locate objects and/or to accurately locate a load platform which supports semiconductor wafers or devices. The present invention bi-direction drive motor(s) maybe used for step and repeat mask aligners which employ laser interferometers and are only limited in accuracy of positioning by the type of interferometer employed. Accurate positioning within 0.2 of a micron is the present state of the art for laser interferometers. The present invention is also uniquely suited for use with numerous types of robotic drives because the present invention is adapted to accurately move relatively large loads over small distances in a matter of milliseconds.

Figure 1:
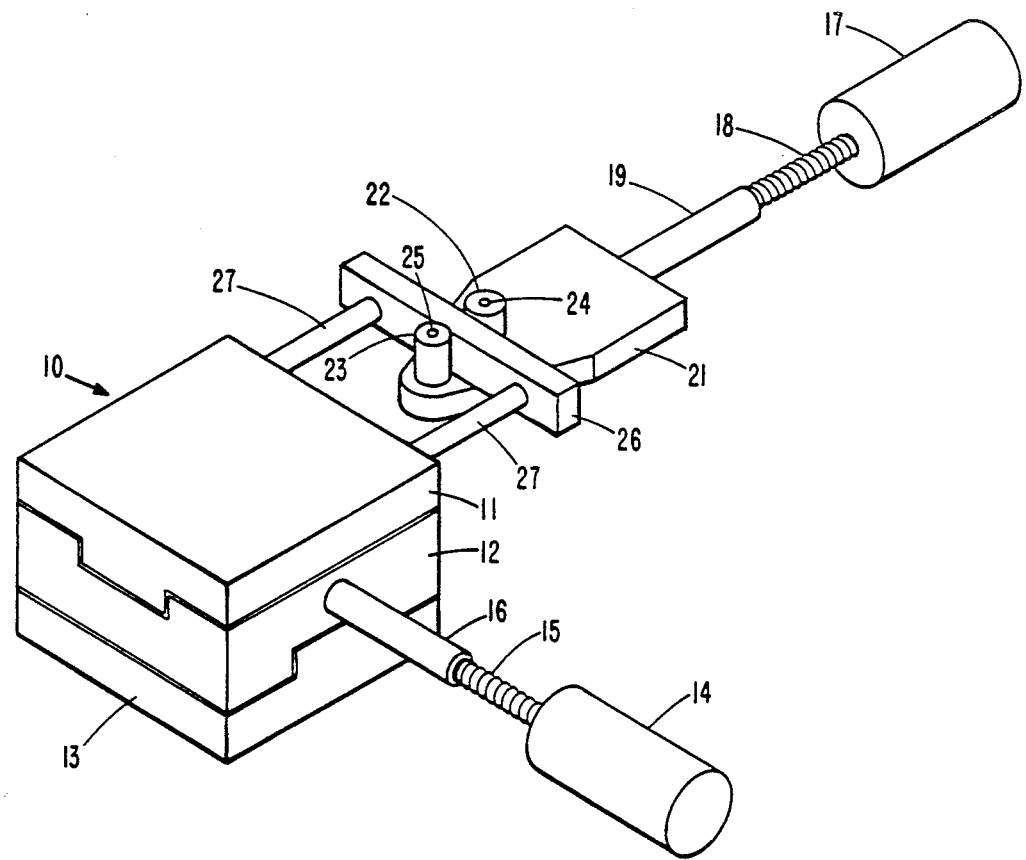
FIG. 1 is an isometric drawing of a prior art X-Y positioning table being driven by two lead screw motors, one of which acts through a way bar.

Refer now to FIG. 1, showing a prior art X-Y positioning table 10 which comprises a top stage slider 11 adapted to be moved only in the Y direction in respect to a lower stage 12 which is adapted to be moved only in the X direction. The base 13 of the X-Y positioning table is adapted to be mounted in a fixed position on a machine or a support as the case may be. X drive motor 14 is adapted to be mounted in a fixed position and is provided with a lead screw 15 which engages in a female threaded sleeve 16, or the equivalent thereof, which is connected to the X direction lower stage slider 12. When X drive motor is driven in a clockwise and/or counter-clockwise direction, lower stage 12 is moved in an X direction and carries with it the top stage slider 11 which is mounted thereon. X-Y positioning tables are commercially available and are known to have the stages mounted on each other, preferably, through bearings (not shown) for movement in the X and Y direction without backlash. The Y drive motor 17 is also provided with a lead screw 18 which engages in a threaded sleeve 19. The threaded sleeve 19 is connected to a support bracket 21 which is guided in the Y direction by means not shown. Roller guides 22 and 23 are rotatably mounted on support bracket 21 by suitable pivots 24 and 25. The way guide bar 26 is mounted between roller guides 22 and 23 to permit movement of the way bar therebetween. Accordingly, guide bar 26 must be accurately machined and accurately aligned parallel to the X axis of movement to prevent introducing positional errors in the Y direction. Spacer bars 27 are connected to the top stage slider 11 and to the way guide bar 26. When the X-Y positioning table 10 is used in a wire bonder or die bonder, the top stage serves as the load platform or the support for a workstation. The X drive motor 14 and the Y drive motor 17 may be activated simultaneously to achieve an accurate predetermined X-Y position of any point on the surface of the top stage or load platform. The disadvantage of the prior art systems are that they require a large number of complex precision parts and structure, exert high bearing loads, are prone to rapid wear and as a system occupy a relatively large area.

Further, the prior art systems do not have high reliability compared to the present invention system. In addition, motor 17 must drive the extra mass represented by guided support bracket 21, and the roller guides 22, 23 mounted thereon, as well as the way guide bar 26 and spacer bars 27. Since the X drive motor 14 is limited to movement of the threaded sleeve 16 in the X direction only, it must be coupled to lower stage 12 in a manner which exerts force on the bearings between stages 11 and 12 in order to position the top stage 11.

Figure 2:
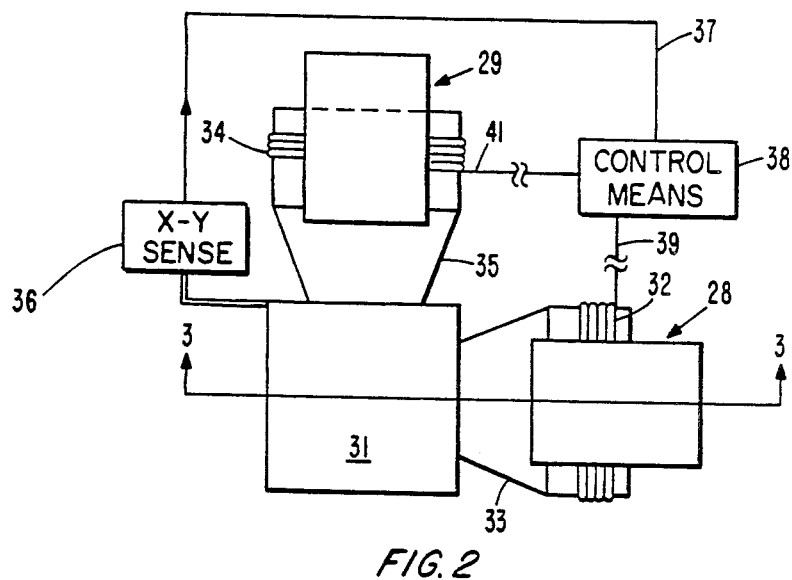
FIG. 2 is a schematic plan view of the present invention bi-directional drive motors coupled to an X-Y positioning table.

Refer now to FIG. 2 which is a schematic plan view of the present invention system employing two by-directional drive motors 28 and 29 coupled to an X-Y positioning table 31. The coil assembly 32 is shown extending from the sides of the X drive motor 28 and is mounted on a coil support 33 which is connected to the load platform 31 as will be explained hereinafter. Similarly, Y drive motor is shown having its coil assembly 34 mounted on a coil support 35 which is connected to the top stage of the load platform 31. An X-Y sensing device 36 is physically connected to the top stage of the load platform 31 and electrically connected via bus 37 to control means 38 which provides the electrical signals via flexible leads 39 and 41 to the coil assemblies 32 and 34 of the X and Y bi-directional drives motors 28 and 29. The X-Y sensor 36 is a schematic representation and the encoder or sensor may be anyone of numerous types of positioning encoders which emit electrical signals, including laser interferometers for the most accurate positioning encoder available today. Control means 38 may be a feedback controller of the type commercially available from suppliers of position encoders or may be a programmed microprocessor for achieving special effects in addition to positioning.

Before discussing the details of the bi-directional motor and its moving coil, note that the X drive motor 28 need only drive the mass represented by the coil assembly 32 and the coil support 33 before engaging the load platform. Similarly, Y drive motor 29 drives the mass represented by coil assembly 34 and coil support 35 before engaging the top stage of load platform 31. Since the coil assemblies 32 and 34 are both capable of being moved transverse to their respective X and Y axis, they may be actuated to drive the top stage of the load platform to a desired X and Y position simultaneously. In the preferred embodiment shown in FIG. 2, the mass represented by the lead screw 18, the threaded sleeve 19, the guided support bracket 21 and roller guides 22, 23, thereon as well as the way guide bar 26 and spacer bars 27 have been eliminated as a mass to be driven by the Y drive motor 29. Further, the cost of the Y direction guide means (not shown) for the guided support bracket 21 has been eliminated. The force necessary to drive any mass to a desired acceleration is greatly reduced when the mass of the intermediate system is eliminated and only the mass of the load platform to be driven remains.

Figure 3:
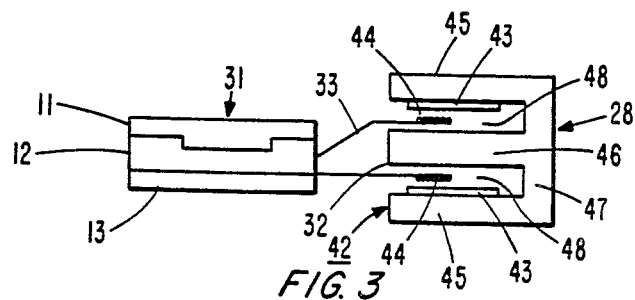
FIG. 3 is a schematic elevation in partial cross section taken at lines 3—3 of FIG. 2 showing a force coil mounted on a coil assembly and connected to a lower stage of an X-Y positioning table.

Refer now to FIG. 3 which is a schematic elevation in partial cross section taken at lines 3—3 of FIG. 2, showing the X drive bi-directional drive motor 28. The bi-directional drive motor 28 comprises an "E" shaped magnetic core assembly 42, a plurality of permanent magnets 43 and a force coil 44. The magnetic core assembly is provided with a pair of outer pole pieces 45 and a center pole piece 46 which are connected to end pole piece means 47. The force coil 44 of coil assembly 32 surrounds the center pole piece 46 and is made wider in the Y direction than the center pole piece to permit transverse movement in addition to movement in the X or force direction. The coil assembly 32 is supported by coil support 33 which is connected to the lower stage 12 of the support platform 31. The magnetic core assembly 42 is preferably made from low carbon magnetic iron or transformer-type steel to support the magnetic field induced therein by the permanent magnets 43. The force coil 44 is positioned in the air gap 48 also between the magnets 43 and the center pole piece 46. When current is applied to the force coil 44, assembly 32, coil support 33, top stage 11 and the lower stage 12 of the load platform 31 are moved either left or right in FIG. 3, depending on the direction of the flux in the air gap and the direction of current in the force coil 44. To best illustrate the present invention, X drive motor 28 has been coupled to drive lower stage 12 in the manner in which prior art-type drive motors 14 or their equivalent, shown in FIG. 1 are employed. Since the force coil 44 in FIG. 3 will not be subject to transverse movement when connected to the lower stage 12, the size of the force coil 44 which extends beyond the side of the magnetic core assembly may be substantially reduced. It is intended that the present invention bi-directional drive motor 29 is connected to the top stage or slider regardless of the type of X direction drive motor that is provided in FIGS. 2 or 3.

Figure 4:
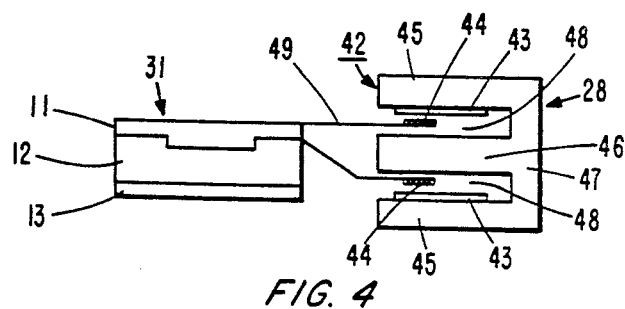
FIG. 4 is a schematic elevation in partial section similar to FIG. 3 having its force coil coupled to the top stage of an X-Y positioning table.

Refer now to FIG. 4 which is a schematic elevation in partial section showing the same X drive motor 28, having its coil support 49 directly connected to the top stage 11 of the load platform 31, otherwise the X drive motor 28 in FIG. 4 is identical to, and numbered the same as, the X drive motor in FIG. 3. As mentioned hereinbefore, there is an advantage to connecting the coil support directly to the top stage 11. In this embodiment, the drive force is not directed through the bearings that connect the sliders. While the driven mass is the same, the stress on the bearing structure is substantially reduced.

Refer now to FIG. 5, showing an enlarged elevation in partial section of the E-shaped magnetic core assembly 42 of the type shown in FIGS. 3 and 4. The vertical thickness of the outer pole pieces 45 is only half as thick as the vertical thickness of the center pole piece 46 and the same thickness as the end pole piece means 47. The size of the air gap 48 is exaggerated in order to more clearly show the location and relatively length of the permanent magnets 43 which are magnetized so as to induce a magnetic field through the coil assembly 32 as shown by the flux lines 51. The height of the core assembly 42 is shown to be H-1 which comprises the thickness of the equivalent of four outer pole pieces plus two air gaps 48 and two magnets 43.

Refer now to FIG. 6 which is an enlarged elevation in partial section of an "E-I" shape magnetic core assembly 52. The flux path has been divided so that flux lines 53 which generate the magnetic field in the air gaps 54 pass through the force coil assembly 32 then to the center of the center pole piece 50 and divide into opposite directions so that the flux is passed through the end pole piece 57 and the "I" shaped section 56 before being returned to the outer pole pieces 55 then through magnets 60 to close the flux line loop 53. It will be noted that to achieve the same flux density as illustrated in FIG. 5, that only half the amount of flux is required in the end pole pieces 56, 57 as is required in the similar system shown in FIG. 5. Similarly, the center pole piece 50 can achieve the same flux density as the center pole piece 46, shown in FIG. 5 with only half the thickness of the center pole piece 46. The height of the "E-I" core assembly is the equivalent of only two outer pole pieces 45, plus two air gaps plus two magnets or four outer pole pieces 55 plus two air gaps, plus two magnets which is smaller in height by two pole piece thicknesses 45.

Refer now to FIG. 7 showing a top or plan view of the core assembly of FIG. 6. The coil support assembly 58 is shown in the form of a bifurcated yoke connected to the coil assembly 32 so as to permit movement of the coil assembly along the length of the center pole piece in the force direction and to be moved transversed thereto without applying force to the coil support assembly 58. The length of the core assembly 52 is the same as the length of the core assembly 42 shown in FIG. 5. The core assembly 52, shown in FIG. 3, presents a smaller mass and thus should be used where weight considerations are important. Further, the thickness of the center pole piece 50 is only half as thick as the center pole piece 46 shown in FIG. 5, thus, the size of the coil assembly and the length of wire required for the coil assembly is reduced because of the reduction in vertical thickness of the center pole piece. Thus, the "E-I" shaped core assembly will permit either a higher flux density in the air gap or a lighter core assembly for the same flux density and force as the "E" shaped core assembly. Either the "E" shaped core assembly or the "E-I" shaped core assembly provides the two degrees of freedom of movement of the coil assembly so as to produce thrust in one direction and freedom of movement in the other direction as required for the novel bi-directional drive motor system.

Refer now to FIG. 8 which is a schematic plan view of a modified bi-directional drive motor system, employing an X drive motor 29 of the type shown and explained with reference to FIG. 2 and two smaller Y drive motors 59 and 61, having coil assemblies 62 and 63, respectively. Both coil assemblies 62 and 63 are connected to the top stage 64 of a load platform which is free to move in a rotational or theta ($\theta$) direction as well as the X and Y direction. For example, assume that only X drive motor 61 is actuated. The upper right hand corner of load platform 64 will attempt to stay in the same position while the lower right hand corner of load platform attempts to move in the X direction causing a rotational action. If a conventional X direction movement is desired, both bi-directional motors 59 and 61 will move their coil assembly 62 and 63 the same distance or amount in the X direction so as to achieve a uniform X direction movement. This does not affect the ability of the Y drive motor 29 to move the load platform 64 in the Y direction. Similarly, if only motor 59 is actuated, there is a rotational movement about the lower right hand corner of load platform 64. However, if X drive motor 59 is moved in one direction and X drive motor 62 is moved in an opposite direction, there is a rotation about the center of the top stage of load platform 64. It is apparent to those skilled in the art of designing and making work stations and load platforms for automatic wire bonders that the top stage 64 of the load platform is designed so that it can pivot about any point regardless of where it is moved by providing a slider plate or a physical pivot point on the workstation below the top stage.

The X-Y-$\theta$ sense means 36' is coupled to the control means 38' by bus 37'. Motors 29, 59 and 61 are controlled by control means 38' via flexible leads 41', 39' and 39".

Figure 9:
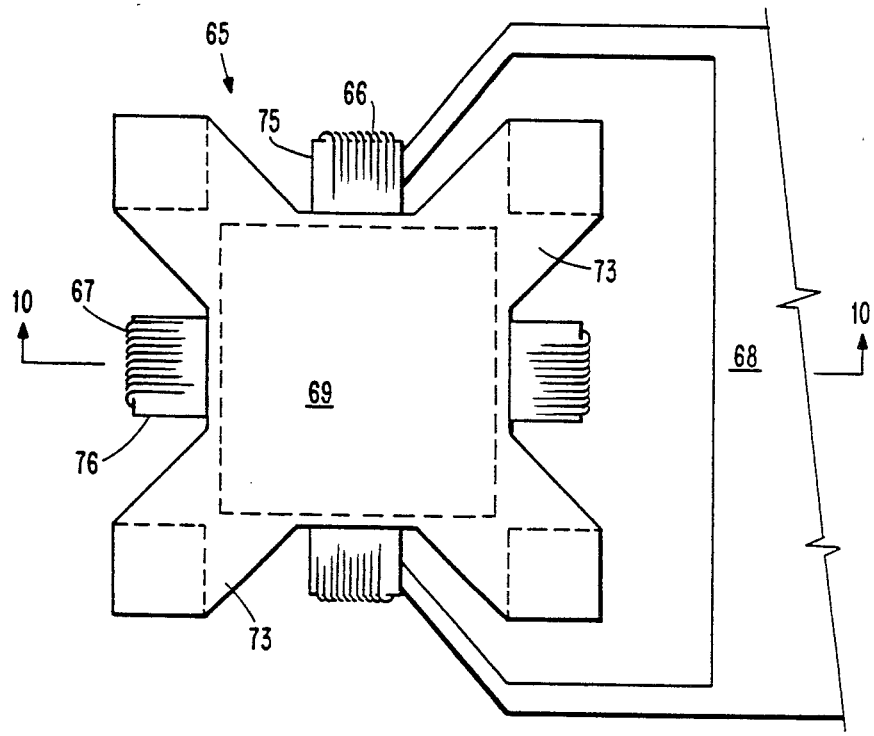
FIG. 9 is a top or plan view of a modified bi-directional drive motor having a pair of orthogonally mounted force coils in a common magnetic core assembly.
Figure 10:
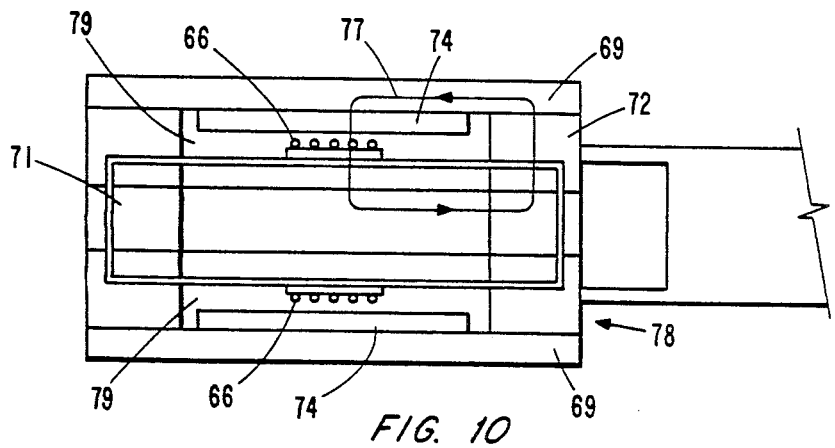
FIG. 10 is a section in elevation taken at lines 10—10 of FIG. 9.

Refer now to FIGS. 9 and 10 showing in plan and elevation views a modified bi-directional drive motor 65 having a pair of othogonally mounted force coils 66 and 67 for imparting both X and Y direction movement to a single coil support 68 which is attached to a load platform (not shown). Outer pole pieces 69 are shown having the same shape as the center pole piece 71, best shown in FIG. 9. The equivalent of end pole piece means 72 are provided by the eight post 72, which are located at the corners of the outer pole pieces and separate the outer pole pieces 69 from the center pole piece 71. The size and shape of the outward extending arms 73 and the permanent magnets 74 need not be limited to the shape shown but should be designed to accommodate the flux density necessary to move the force coil 66 and 67 and provide uniform distribution through the core assembly. In the preferred embodiment shown, coil assemblies 75 and 76 are shown physically connected to each other. Thus, when force coil 66 is energized, it moves coil support 68 and coil assembly 76 in the X direction and when force coil 67 is energized, it moves the coil assembly and the coil support attached thereto in the Y direction. A flux path 77 is shown coupled through force coil 66 and extending through the center pole piece 71, a post 72 and an outer pole piece 69. It will be understood that eight such flux paths 77 are provided by the novel bi-directional drive motor 65 in a manner similar to that explained with regard to the "E-I" core structure of FIG. 6 and that the post 72 need only be sufficiently large in cross section to accommodate the necessary flux density of an end pole piece means which is provided by two sets of two posts rather than in one slab section. The bi-directional motor 65, shown in FIGS. 9 and 10 is adapted to drive a single coil support in both an X and a Y direction employing only a single core assembly 78 and is not limited to the form of the structure shown. While it is possible to locate a force coil 66 and a force coil 67 in the same air gap 79, it is not necessary that the two orthogonally positioned force coils be connected to each other. It is possible to move force coil 66 and force coil 67 independent of each other in the air gap 79, however, a more complex coil support is required to prevent bending or distortion of the coil supports which are preferably made rigid to avoid bending or distortion. Applications which do not require extreme accurancy are capable of tolerating some bending or distortion, because the encoder or X-Y sensing device is preferably attached to the load platform or object being moved.

Having explained the preferred embodiment core assemblies with slab magnets attached to the outer pole pieces, it will be understood that such permanent magnets may be placed on an exposed surface of any of the pole pieces to provide the magnetic flux in the air gaps. Further, the core assembly itself may comprise a permanent magnetic or be wound with electrical coils to provide electromagnetic flux in the core assembly. Magnetic means which provide high flux density for a given weight of core assembly are preferred.

Having explained a preferred embodiment bi-directional drive motor and modifications thereof, it is now apparent that the present invention bi-directional drive motor is superior for many applications to linear drive motors which are restricted to movement in a single axial direction and, to achieve bi-directional movement must employ intermediate linking devices which must be driven as a mass along with the load platform. The present invention bi-directional drive motor not only is simplier, more reliable, provides a smaller overall package and greater precision than systems of the prior art.

I claim:

1. A bi-directional drive motor system for positioning an X-Y load platform in a predetermined X and Y position comprising:
    a load platform having an X-Y movable top stage,
    a first bi-directional drive motor located beside and rigidly connected to said movable top stage through a first coil support for force movement in only an X direction,
    a second bi-directional drive motor located beside and rigidly coupled to said movable top stage through a second coil support for force movement in only a Y direction,
    said bi-directional drive motors comprising a magnetic core assembly, magnet means and a y or an x force coil assembly,
    said magnetic core assembly having a pair of outer pole pieces and a center pole piece connected by end pole piece means,
    air gaps between said outer pole pieces and said center pole pieces,
    said X force coil assembly having a coil mounted on said first coil support connected to said movable top stage and being free to be moved in the Y direction,
    said Y force coil assembly having a coil mounted on said second coil support coupled to said movable top stage and being free to be moved in the X direction,
    said force coils being positioned in said air gaps, and
    control means for individually actuating said X and Y force coils independently to position said top stage of said load platform in a predetermined X and Y position.

2. A bi-directional drive motor system as set forth in claim 1 wherein said X force coil and said Y force coil are connected positioned transversly to each other in the same air gaps of the same magnetic core assembly and are movable independent of each other.

3. A bi-directional drive motor system as set forth in claim 2 wherein said X force coil assembly and said Y force coil assembly are connected together on a single coil support connected to said movable top stage.

4. A bi-directional drive motor system as set forth in claim 2 wherein said end pole piece means comprise a plurality of post.

5. A bi-directional drive motor system as set forth in claim 4 wherein said post are connected between said outer pole pieces and said center pole piece.

6. A bi-directional drive motor system as set forth in claim 2 wherein said outer pole pieces and said center pole piece have the same shape in plan view.

7. A bi-directional drive motor system as set forth in claim 6 wherein said center pole piece is twice as thick as said outer pole pieces.

8. A bi-directional drive motor system as set forth in claim 2 wherein said end pole piece means comprise four post connected to four outward extending arms provided on said outer pole pieces.

9. A bi-directional drive motor system as set forth in claim 2 wherein said end pole piece mean comprise eight post connected between said outer pole pieces and said center pole piece.

10. A bi-directional drive motor system for positioning a load platform in a predetermined X and Y position comprising:
    a base,
    load platform means mounted on said base,
    said load platform means having a lower stage supporting a top stage movable in an X and a Y direction,
    a bi-directional drive motor comprising a magnetic core assembly, magnet means and a force coil assembly located beside said load platform,
    said magnetic core assembly having a pair of outer pole pieces and a center pole piece connected by end pole piece means,
    a force coil assembly mounted on a coil support which is connected to said load platform means for moving said top stage of said load platform means,
    said force coil assembly having a plurality of turns coaxially surrounding said center pole in said air gaps,
    said plurality of turns and said force coil assembly being larger than said center pole to permit force movement along the length of said center pole as well as movement transverse to said center pole, and
    a motor assembly connected to said load platform means for moving said top stage in a direction transverse to said length of said center pole piece.

11. A bi-directional drive motor system as set forth in claim 10 wherein said motor assembly comprises a second bi-directional drive motor connected to said load platform means transverse to said bi-directional drive motor.

12. A bi-directional drive motor system as set forth in claim 11 wherein said load platform means comprises an X-Y positioning table and said second bi-directional drive motor is connected to said top stage.

13. A bi-directional drive motor system as set forth in claim 10 wherein said load platform means comprises an X-Y positioning table having a lower slider stage movable in only an x direction, and
    said motor assembly comprises a voice coil motor movable in only an X direction connected to said lower slider stage.

14. A bi-directional drive motor system as set forth in claim 10 wherein said motor assembly comprises a second force coil assembly having a second force coil mounted on a second coil support connected to said load platform means.

15. A bi-directional drive motor system as set forth in claim 10 wherein said motor assembly comprises a second force coil mounted on said coil support connected to said load platform means.

16. A bi-directional drive motor system as set forth in claim 14 wherein said second force coil assembly comprises a voice coil of a linear drive motor.

17. A bi-directional linear drive motor system as set forth in claim 14 wherein said load platform means comprises an X-Y positioning table having a top stage connected to said bi-directional drive motor and to said motor assembly.

18. A bi-directional drive motor system as set forth in claim 10 wherein said magnetic core assembly is "E" shaped in cross section.

19. A bi-directional drive motor system as set forth in claim 10 wherein said magnetic core assembly is E-I shaped in cross section.

20. A bi-directional drive motor system as set forth in claim 18 wherein said center pole piece is twice as thick as said pole pieces.

* * * * *